(12) United States Patent
Danan

(10) Patent No.: US 7,907,144 B2
(45) Date of Patent: Mar. 15, 2011

(54) OPTIMIZED TILE-BASED IMAGE STORAGE

(75) Inventor: Itai Danan, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 1317 days.

(21) Appl. No.: 11/279,765

(22) Filed: Apr. 14, 2006

(65) Prior Publication Data

US 2007/0242077 A1 Oct. 18, 2007

(51) Int. Cl.
*G06T 1/60* (2006.01)
(52) U.S. Cl. .................. 345/530; 345/418
(58) Field of Classification Search .......... 345/530
See application file for complete search history.

(56) References Cited

U.S. PATENT DOCUMENTS

| | | | |
|---|---|---|---|
| 5,559,940 A | 9/1996 | Hutson | |
| 5,646,866 A | 7/1997 | Coelho et al. | |
| 5,815,168 A | 9/1998 | May | |
| 5,999,199 A * | 12/1999 | Larson | 345/531 |
| 6,337,691 B1 | 1/2002 | Trainor | |
| 6,616,702 B1 | 9/2003 | Tonkin | |
| 6,741,255 B1 | 5/2004 | Furlani et al. | |
| 2001/0032221 A1 | 10/2001 | Anwar | |
| 2003/0140315 A1 | 7/2003 | Blumberg et al. | |
| 2003/0225925 A1 | 12/2003 | Kusterer et al. | |
| 2004/0100471 A1 | 5/2004 | Leather et al. | |
| 2004/0179019 A1 | 9/2004 | Sabella et al. | |
| 2004/0237041 A1 | 11/2004 | Koike et al. | |
| 2005/0076298 A1 | 4/2005 | Lutz | |
| 2005/0076299 A1 | 4/2005 | Simpson et al. | |

* cited by examiner

*Primary Examiner* — Xiao M Wu
*Assistant Examiner* — Maurice McDowell, Jr.
(74) *Attorney, Agent, or Firm* — Gates & Cooper LLP

(57) ABSTRACT

A computer-implemented method, apparatus, and article of manufacture provide the ability to store image data for use in a real-time compositing computer application. A storage tile size is determined based on disk input/output (I/O) hardware testing. A processing tile size is determined based on graphics I/O testing. An image is obtained and processing tiles (of the processing tile size) are mapped over the image. A center of the image is used as a point of origin for the processing tiles. The processing tiles are mapped to storage tiles. The storage tile point of origin is located at a lower left corner of the processing tiles. Each storage tile is configured to contain complete processing tiles that are stored in the storage tiles based on the storage tile size, processing tile size, and the mappings.

27 Claims, 7 Drawing Sheets

OPTIMIZED TILE-BASED IMAGE STORAGE

BACKGROUND OF THE INVENTION

1. Field of the Invention

The present invention relates generally to image/video display and processing systems, and in particular, to a method, apparatus, and article of manufacture for storing and accessing images in a real-time compositing system.

2. Description of the Related Art

Audio and video files, in the form of a plurality of digitized frames or clips, are often very large and consume considerable time and bandwidth to display and process. During the editing process, such frames/clips are often combined or composited together to provide an end result. In addition, when previewing and working with such clips, the data needs to be moved from disk storage to memory to the central processing unit (CPU). To achieve the highest quality results, image compositing systems/applications need to be real-time, allowing authors/editors to preview clips (as closely as possible) at the quality at which they will be finally rendered. However, the large size and amount of such data prevents prior art applications from achieving real-time compositing performance for clips above a certain resolution (e.g., 2K).

The result of the hardware limitations forces editors to preview edits using an approximation of the final render, which typically uses lower resolution versions of the media/data as a proxy. This problem appears in compositing systems for clips that require large background plates over which the camera will pan. As a result, editors must make critical artistic (and business) judgments based on this lower-quality version. Alternatively, the editors may take the time to perform a final render on a clip. Such a final rendering operation consumes additional time and incurs additional costs. Accordingly, what is needed is a tool/methodology for enabling real-time performance of a compositing system. These problems may be better understood with a further explanation of prior art compositing systems and storage operations.

As described above, prior art compositing systems often utilize lower quality images during editing/compositing operations. In this regard, the prior art systems failed to provide any real-time compositing with images larger than a certain size. For example, prior art compositing may have performed real time compositing with images that fit on a single texture using texture memory. However, such processing was not performed on larger size images and thus restricted the operations (and the accuracy of such operations) that could be performed.

In addition to prior art compositing operations, the prior art utilizes various schemes to store image data in memory or on disk. For example, disk-based tiling for storage and manipulation of large images is common in the prior art. For example, numerous image-processing systems store images as collections of fixed-size tiles on disk and retrieve only the required tiles into memory on an as-needed basis. However, disk-based tiling along cannot enable a compositing system to achieve real-time performance. For example, the size of the fixed tiles used may not be optimized for disk input/output (I/O), graphics I/O, and/or CPU processing.

To expedite processing, some prior art systems adopted their own proprietary file system wherein space was reserved and allocation could be controlled. However, such systems prevented the ability to utilize open file systems such as NTFS™ (NT File System—utilized in Windows™) or XFS™ (X File System—utilized in Linux™). Such open file systems split files into blocks and do not guarantee a contiguous file.

Testing of such open file systems indicate that files larger than a certain size (e.g., 8 MB) are likely not to be contiguous. To expedite processing, it is desirable to minimize the disk I/O. Accordingly, an image may be split into tiles based on the hardware size testing (e.g., tiles of 8 MB). However, for processing, the graphics I/O (e.g., the video processing unit) or the CPU may prefer smaller tiles. Accordingly, the larger size tiles would minimize disk I/O but complicate and extend the time to perform any further processing. Further, it may not be possible to perform any processing using such tiles (i.e., if the video processing unit [VPU] does not or cannot handle a tile of such a large size).

SUMMARY OF THE INVENTION

Image tiling is used in two different manners with a system for managing coherence between the two methods. Processing tiles are optimized for memory transfers, cache-coherence, and graphic device output. Storage tiles are optimized for disk I/O and DMA transfers. A persistent data structure is used to map between processing tiles and storage tiles in an efficient manner by performing at most one persistent index lookup per processing tile. The scheme utilizes two coordinate systems (one for each type of tile) and clustering several processing tiles into one storage tile.

In view of the above, optimal tile storage size and processing tile size are separately determined through hardware benchmark testing. An image is broken up into processing tiles of the processing tile size and the processing tiles are clustered or mapped into storage tiles that meet the hardware benchmark. When a processing tile is requested, the appropriate storage tile is determined and retrieved. For processing, processing tiles have a point of origin in the center of the image. However, storage tiles are adjusted so that the point of origin is in the corner of all of the processing tiles and not the middle. Thus, the origin for the storage tile is adjusted so that the common SD, HD, and 2K film frame resolutions fit in a single storage tile without being broken up across multiple storage tiles and processing tiles.

When a processing tile is requested, the system merely examines the image size to determine which storage tile the processing tile is located in. An index is created and keyed on time, proxy scale (for the image size), and storage tile. Each index entry has information regarding which processing tiles are processed/computed in a storage tile and the image size. Using the index and information, the disk and storage tiles are managed like a cache.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
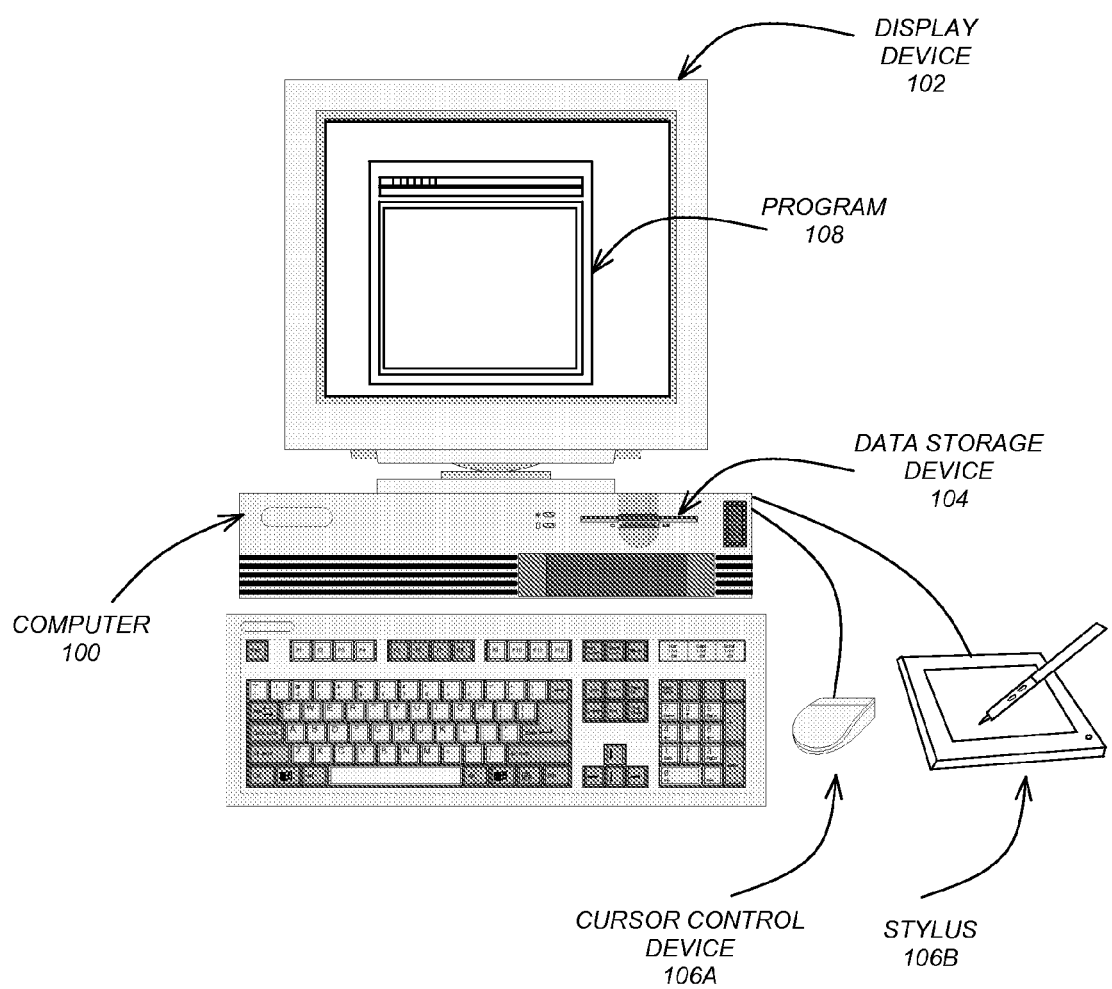
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage device(s) 104, cursor control devices 106A, stylus 106B, and other devices. Those skilled in the art will recognize that any combination of the above components, or any number of different components, peripherals, and other devices, may be used with the computer 100.

One or more embodiments of the invention are implemented by a computer-implemented program 108. Such a program may be a media player, a video editing program, an effects program, compositing application, or any type of program that executes on a computer 100. The program 108 may be represented by a window displayed on the display device 102. Generally, the program 108 comprises logic and/or data embodied in/or readable from a device, media, carrier, or signal, e.g., one or more fixed and/or removable data storage devices 104 connected directly or indirectly to the computer 100, one or more remote devices coupled to the computer 100 via a data communications device, etc. In addition, program 108 (or other programs described herein) may be an object-oriented program having objects and methods as understood in the art.

Figure 2:
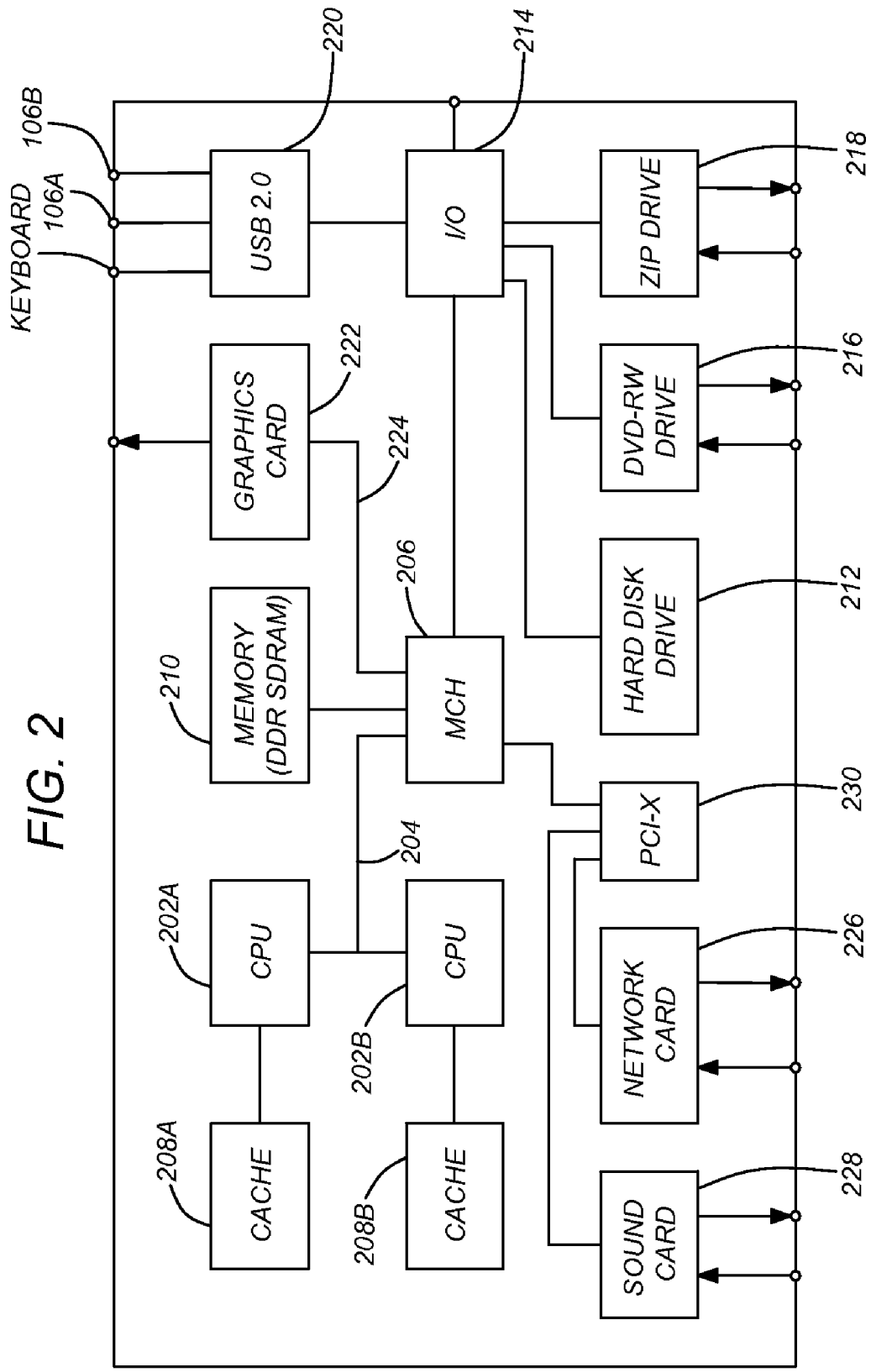
FIG. 2 illustrates details of the computer system of FIG. 1 in accordance with one or more embodiments of the invention.

The components of computer system 100 are further detailed in FIG. 2 and, in one or more embodiments of the present invention, said components are based upon the Intel® E7505 hub-based chipset.

The system 100 includes two central processing units (CPUs) 202A, 202B (e.g., Intel® Pentium™ Xeon™ 4 DP CPUs running at three Gigahertz, or AMD™ CPUs such as the Opteron™/Athlon X2™/Athlon™ 64), that fetch and execute instructions and manipulate data via a system bus 204 providing connectivity with a Memory Controller Hub (MCH) 206. CPUs 202A, 202B are configured with respective high-speed caches 208A, 208B (e.g., that may comprise at least five hundred and twelve kilobytes), which store frequently accessed instructions and data to reduce fetching operations from a larger memory 210 via MCH 206. The MCH 206 thus co-ordinates data flow with a larger, dual-channel double-data rate main memory 210 (e.g., that is between two and four gigabytes in data storage capacity) and stores executable programs which, along with data, are received via said bus 204 from a hard disk drive 212 providing non-volatile bulk storage of instructions and data via an Input/Output Controller Hub (ICH) 214. The I/O hub 214 similarly provides connectivity to DVD-ROM read-writer 216 and ZIP™ drive 218, both of which read and write data and instructions from and to removable data storage media. Finally, I/O hub 214 provides connectivity to USB 2.0 input/output sockets 220, to which the stylus and tablet 106B combination, keyboard, and mouse 106A are connected, all of which send user input data to system 100.

A graphics card 222 receives graphics data from CPUs 202A, 202B along with graphics instructions via MCH 206. The graphics card 222 may be coupled to the MCH 206 through a direct port 224, such as the direct-attached advanced graphics port 8X (AGP™ 8X) promulgated by the Intel® Corporation, or the PCI-Express™ (PCIe) x16, the bandwidth of which may exceed the bandwidth of bus 204. The graphics card 222 may also include substantial dedicated graphical processing capabilities, so that the CPUs 202A, 202B are not burdened with computationally intensive tasks for which they are not optimized.

Network card 226 provides connectivity to a framestore by processing a plurality of communication protocols, for instance a communication protocol suitable to encode and send and/or receive and decode packets of data over a Gigabit-Ethernet local area network. A sound card 228 is provided which receives sound data from the CPUs 202A, 202B along with sound processing instructions, in a manner similar to graphics card 222. The sound card 228 may also include substantial dedicated digital sound processing capabilities, so that the CPUs 202A, 202B are not burdened with computationally intensive tasks for which they are not optimized. Network card 226 and sound card 228 may exchange data with CPUs 202A, 202B over system bus 204 by means of a controller hub 230 (e.g., Intel®'s PCI-X controller hub) administered by MCH 206.

Those skilled in the art will recognize that the exemplary environment illustrated in FIGS. 1 and 2 are not intended to limit the present invention. Indeed, those skilled in the art will recognize that other alternative environments may be used without departing from the scope of the present invention.

Software Environment

As described above, a software application 108 such as a compositing application/system may execute on computer 100. As described above, what is needed is a system to perform real-time performance with images of arbitrary sizes in a compositing system 108. However, the bottleneck that restricts performance is often the disk I/O. Accordingly, there is a need to minimize disk I/O. Ideally, it is desirable to contain all information in a single disk I/O operation or in a single file/tile. However, because of the limitations of open file systems and hardware, such single file/tile I/O transfer operations are not possible. Further, graphics I/O processing and CPU processing may provide further limitations.

To overcome the deficiencies of the prior art, the software application 108 utilizes tiling in two different manners (i.e., processing tiles and storage tiles) at once and implements a system for managing coherence between the two. Processing tiles are optimized for memory transfers, cache-coherence and graphic device output. Storage tiles are optimized for disk I/O and DMA transfers. A persistent datastructure is used to map between the processing tiles and storage tiles in an efficient manner by performing at most one persistent index lookup per processing tile. The scheme is rendered useful by using two coordinate systems (one for each type of tile) and clustering several processing tiles into one storage tile. The mapping of processing tile clusters into storage tiles is further altered based on benchmarked disk I/O performance and a modification to the disk driver's internal queue to optimally collapse adjacent requests.

To provide for real-time compositing, one or more embodiments of the invention performs tile clustering wherein processing tiles are collected into storage tiles. The storage tiles are ideal for disk I/O while the processing tiles are ideal for graphics I/O and/or CPU processing. Accordingly, through hardware benchmark testing of the disk I/O (i.e., of disk drive 212 via I/O hub 214), an optimum storage tile size is determined.

For example, hardware benchmark testing may indicate that storage tiles of 8 MB are the largest size file/tile that can be processed by NTFS to provide a contiguous file/operation. Such benchmark testing may involve progressively storing files of larger sizes while timing the operations to determine the maximum size storage tile without a reduction in performance. Similarly, hardware benchmark testing of the graphics card 222 or CPUs 202A, 202B (i.e., of graphics I/O) provides an optimum processing tile size. Such benchmark processing may provide for performing various graphics operations (i.e., using graphics card 222 and/or CPUs 202A, 202B) on files/tiles of various sizes while timing the graphics operations to determine the maximum processing tile size without a reduction in performance. Alternatively, the performance characteristics may be obtained from the manufacturer's stated properties of the graphics card 222, CPUs 202A, 202B, and disk I/O 214 and hard disk 212.

During a compositing or other editing operation, it is necessary to align images from different clips. For example, if compositing two images to create a composite image of a person loading a truck (e.g., see FIG. 3), if the images are not aligned based on the center points of the images, processing would not be efficient. In this regard, as described above, graphics processing is optimized when provided with two processing tiles to produce a single result tile (i.e., accessing one tile for the two image inputs). If the two images are not centrally aligned, multiple processing tiles would potentially be needed for each portion of the two images being composited.

To properly align images, coordinate systems are used to reference images and tiles in such images. Coordinate systems further establish where tiles are located during processing. As described above, users expect coordinate systems to be located in the center of two images during processing such that the two images are centered with respect to each other for processing/compositing. Accordingly, to provide efficient processing, embodiments of the invention provide for utilizing a coordinate system that is located at the center of the image during processing. In this regard, a universal coordinate system for processing tiles is located at the center of each image such that the pixels and the pixel coordinates (e.g., the pixels located in tile [0,0]) always corresponds to the same pixels regardless of the image that the pixels are retrieved from.

Figure 3:
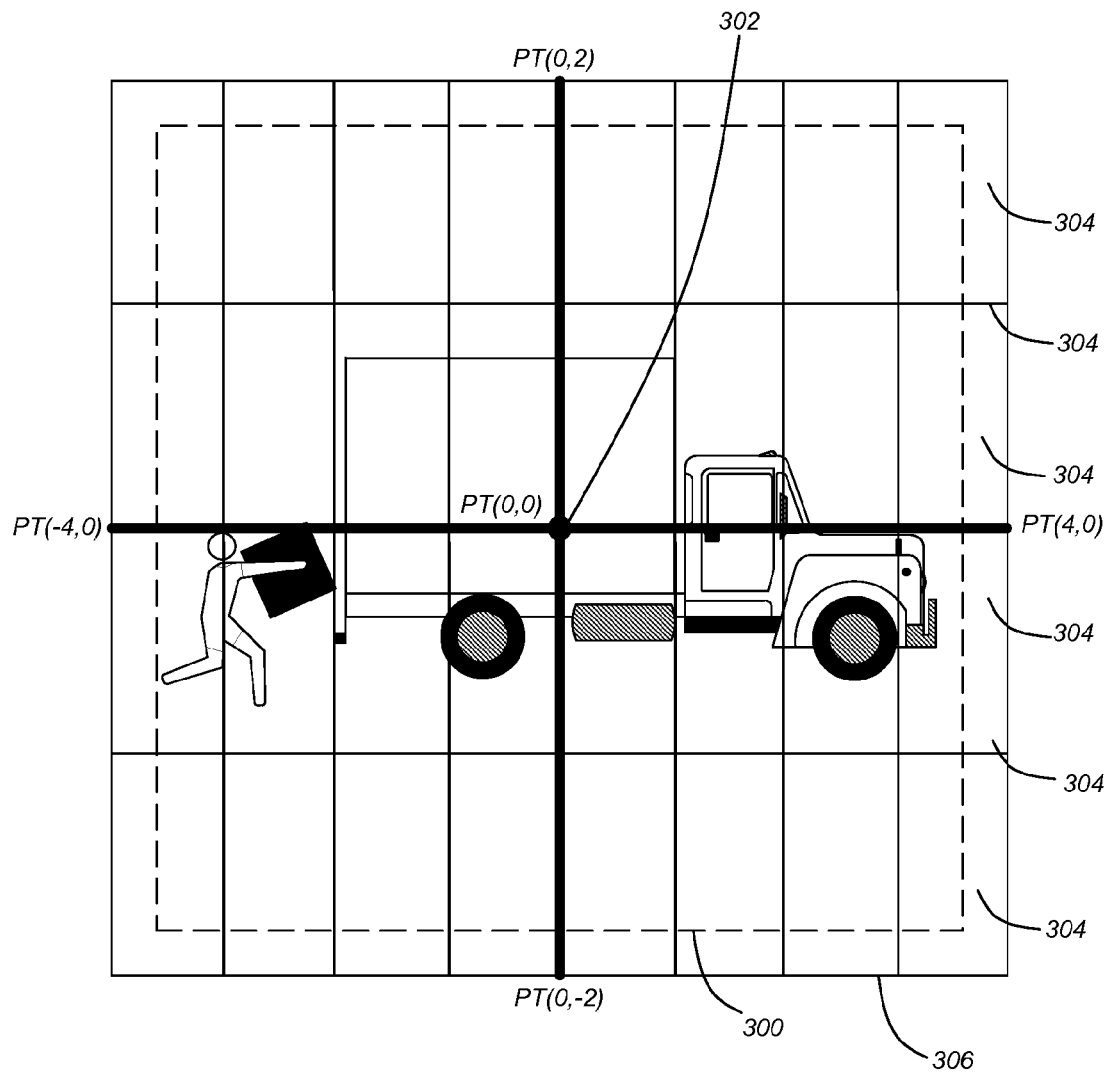
FIG. 3 illustrates an image with a point of origin of a coordinate system located in the middle of the image in accordance with one or more embodiments of the invention.

FIG. 3 illustrates an image 300 with a point of origin 302 of a coordinate system located in the middle of the image 300. It may be noted that the image of the man and the truck may have been composited together to create the result image shown in FIG. 3 wherein both the image containing the man and the image containing the truck have a point of origin 302 for the coordinate system located in the middle of the images. Thus, once the point of origin 302 is provided, the processing tiles 304 are mapped over the image using the center of the image as the point of origin 303 for the universal coordinate system for the tiles.

While processing tiles 304 are optimized for graphics processing, such tile size is not optimized for disk/storage I/O. Thus, if one were to store the processing tiles 304 directly onto a disk 212, disk I/O would not be optimized because of the tile size. To optimize disk I/O, storage tiles are used and multiple processing tiles 304 are stored in each storage tile. However, because of the size differences, if the same centrally located coordinate system is maintained for storage tiles, processing tile (0,0) would likely correspond to a chunk in storage that includes several storage tiles. Accordingly, during a retrieval operation, multiple storage tiles (and disk I/O operations) would be needed to retrieve a single processing tile 304. Such an operation would increase the processing time. Further, to maintain the same coordinate system, the system would be forced to divide each image into four (4) storage tiles or a multiple of four (4) storage tiles (covering each quadrant of the universal coordinate system). However, such a division may not be optimized for the disk I/O size determined during benchmark testing.

To optimize for disk I/O, one or more embodiments of the invention provide for a point of origin of a coordinate system for the storage tiles to be located in the lower left corner of all of the processing tiles 304 for the image 300. The question becomes how many processing tiles to use to cover the image and how many storage tiles should be used.

Figure 4:
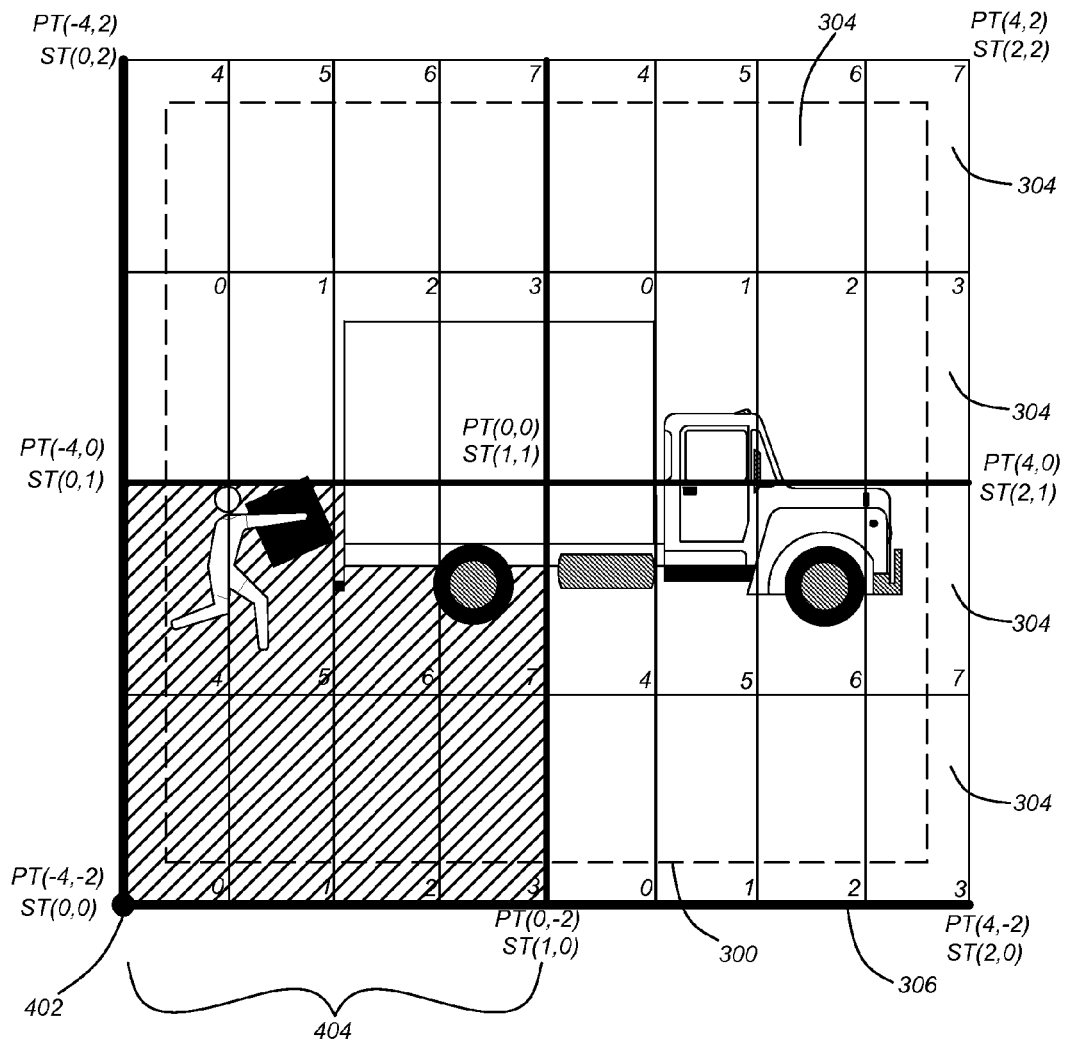
FIG. 4 illustrates the placement and arrangement of storage tiles in accordance with one or more embodiments of the invention.

Since both the processing tiles 304 and storage tiles are fixed in size (the processing tiles 304 fixed by pixel size and the storage tile fixed in MB), the first part of such an analysis determines how many processing tiles 304 can fit into each of the storage tiles. FIG. 4 illustrates the placement and arrangement of storage tiles 404 in accordance with one or more embodiments of the invention. An example of the storage tile 404 in FIG. 4 is illustrated with the patterned background. Embodiments of the invention provide that only complete processing tiles 304 are placed into a storage tile 404 (i.e., only a multiple of a complete processing tile 304 is placed into a storage tile 404). In other words, partial processing tiles 304 are not stored in a storage tile 404.

Since only complete processing tiles 304 are stored in a storage tile 404, the area consumed by processing tiles 304 may be less than the area of the storage tile 404. As used herein, the area that defines the image itself is referred to as a region of definition (ROD). In FIG. 3, the ROD for the image is identified by the dashed line 300 and illustrates that the ROD 300 is smaller than the area consumed by all of the processing tiles 304. If the area of all of the complete processing tiles 304 is larger than the ROD 300, the processing tiles 304 may extend beyond the ROD 300. In this regard, the area between the ROD 300 and the outside boundary of all of the processing tiles 304 may be padding or extra space. Such extra space is included in both the processing tiles 304 and in the storage tiles 404.

The allocation of extra space in the storage tile 404 and/or processing tiles 304 may be utilized at a later date if the image size is expanded. In such a situation, a reallocation does not need to be performed. For example, if a user crops an image and later removes the cropping, there may not be a need to reallocate more memory. Instead, the processing tiles 304 and storage tiles 404 may already have sufficient allocated space to accommodate the extra pixels.

As described above, one or more processing tiles 304 may be stored in each storage tile 404. It is desirable to achieve the minimum number of storage tiles 404 to encompass all of the processing tiles 304. As described above, storage tiles 404 are fixed in size (e.g., MB) based on the benchmark testing. Similarly, processing tiles 304 are fixed in size based on the number of pixels. Accordingly, depending on the size of pixels, a different number of processing tiles 304 may fit in a storage tile 404 for different images. For example, more 8-bit processing tiles 304 would fit in a storage tile 404 than 32-bit processing tiles 304. Based on the sizes of the both the processing tiles 304 and storage tiles 404, the system may determine how many processing files 304 will fit in each storage tile 404.

To determine the number of processing tiles 304 that can fit in a storage tile 404, the appropriate size units must be the same for both processing tiles 304 and storage tiles 404. In other words, based on the number of pixels and the size of the pixels, a determination is made regarding how many MB are consumed by a processing tile 304. Once the equivalent measurements units are established, a ratio of the storage tile size to the processing tile size is determined. For example, if a processing tile 304 is 256×256 (=65,636) pixels and the pixels are 16-bits or 2-byte pixels, it may be determined that there are 131,072 bytes (65,636*2) or 0.125 MB per processing tile 304. If a storage tile 404 is 1 MB, the ratio 1/0.125 provides that there are 8 processing tiles can fit in the 1 storage tile 404.

For optimized processing, the coordinates must be aligned such that there is never a single processing tile 304 that spans multiple storage tiles 404. To properly align the tiles, a square or rectangular shape is preferred. Accordingly, the square root of the ratio is determined. Continuing with the above example, the square root of 8 is computed (i.e., 2.82 . . . ). The square root is rounded down to obtain the next lowest whole number. The rounded number is used to establish the number of columns and rows of the processing tiles 304 that will fit in a storage tile 404. With the example above, rounding down the square root of 8 provides for two columns and two rows of processing tiles 304. Thus, it is known that a 2×2 square of processing tiles 304 will fit in the single storage tile 404. However, such a result may often utilize more storage tiles 404 than are needed. With the above example, the square root of 8 is closer to 3 than 2 thereby indicating more processing tiles 304 could potentially fit in a single storage tile 404.

With the rounded number as a starting point for the number of columns and rows, the system expands in one direction (e.g., columns) to determine if a larger number of processing tiles 304 will fit in each storage tile 404. Continuing with the above example, the number of columns may be expanded to 3 resulting in a 3×2 rectangle of processing tiles 304. A determination is made regarding whether the expanded rectangle still fits in the single storage tile 404 (i.e., by multiplying the number of columns by the number of rows). Since 3×2 is 6 and a total of 8 processing tiles 304 can actually fit in the single storage tile 404, the expanded rectangle remains. The expansion in this direction continues until the largest rectangle possible is obtained. For example, the rectangle may be expanded again to a 4×2 rectangle that equals 8 processing tiles 304 (4×2). In this example, the procedure would continue one more time and find that a 5×2 rectangle would be larger than the 8 processing tiles 304 and therefore the 4×2 rectangle would be used instead.

In addition to, or prior to determining if the expanded rectangle is larger than the maximum number of processing tiles 304 (e.g., 8), the process may also determine if the expanded rectangle would be outside of the ROD 300. For example, if a tall and narrow image/ROD 300 were being used, while the number of processing tiles 304 may not exceed the maximum number, the expanded number of columns could extend beyond the ROD 300. Accordingly, expanding the original square by adding columns may not be appropriate. If the expanded number extends beyond the ROD 300, the expansion in the current direction is stopped and continues as described below.

The system continues and expands in the other direction (i.e., by rows) to determine if an even larger rectangle will fit. If the expansion is larger than the number of processing tiles 304 that will fit in a single storage tile 404, the expansion is backed off and the prior expanded (or non-expanded) version is used as the format for the processing tiles 304 in each storage tile 404. Similarly, if the expansion extends beyond the ROD 300, the prior non-expanded version of the rectangle is used.

Continuing with the above example, the rectangle is expanded to a 4×3 rectangle resulting in 12 total processing tiles 304. Since the storage tile 404 can only contain 8 processing tiles 304, the expansion is backed off resulting in a 4×2 rectangle again. Thus, the 4×2 rectangle is used as the format for the 8 processing tiles 304 that are stored in each storage tile 404.

Once the number and format of the processing tiles 304 in each storage tile 404 has been determined, the space may be allocated on disk for the storage tiles 404. In this regard, one or more files are utilized to store the one or more storage files 404 and accordingly, the files having the designated storage file size 404 may be allocated the appropriate amount of disk space. The name of the file, in which a particular storage tile 404 is stored on disk, is stored in a persistent hash map (e.g., on disk 212). The persistent hash map is used to determine which processing tiles 304 and/or storage tiles are computed and located on disk 212.

The persistent hash map for the disk 212 may be based on a third party plug-in or database. For example, Berkeley DB™ available from Sleepycat Software™ may be used to implement the persistent hash map. Such a database may be used because the information remains persistent in the database for the disk 212. Referring to FIG. 2, such a database may be stored in a variety of formats and accessible via I/O port 214.

Prior to a particular processing tile 304 being computed, the spot in the storage tile 404 on disk 212 that would contain the processing tile 304 is empty. Such a spot in the storage tile 404 on disk 212 may also be empty if the processing tile 304 is removed from the disk 212. Such a removal may result due to the management of the storage tiles 404 on disk 212 similar to a cache. In this regard, a processing tile 304 may be removed as part of the disk cache protocol (e.g., least recently used, least frequently used, etc.). However, once computed by a compositing application, the processing tile 304 may be stored in the storage tile 404 on disk 212.

The question remains regarding how to determine which storage tile 404 to store the processing tile 304 in and which file contains the appropriate storage tile 404. When storing (or requesting) a processing tile 304, the coordinates of the area the user wants to store/request are provided by the user/application. The first step in the process is to calculate a difference vector from the coordinates provided to the lower left corner of all of the processing tiles 304 (i.e., the processing tile coordinates at the storage tile point of origin 402). Such a difference vector provides the offset from the ST point of origin 402 to the coordinates being stored/requested by the user. For example, if the coordinates being stored/requested are (2,1), the known processing tile coordinates at the ST point of origin 402 would be subtracted from (2,1). Referring to FIG. 4, the PT coordinates at ST(0,0) are PT(−4,−2). Accordingly, the difference vector would be (2,1)−(−4,−2)= (6,3).

To identify the storage tile 404 that contains the requested processing tile, the difference vector is then divided by the number of processing tiles 304 that fit in a storage tile 404 in each respective direction. Continuing with the above example, the difference vector (6,3) is divided by (4,2) in the respective directions resulting in (1r2,1r1) (r specifies the remainder or modulo value). The quotient (1,1) provides the coordinates of the storage tile 404 that contains the provided coordinates. Thus, the originally requested coordinates of PT(2,1) are located in the storage tile at ST(1,1).

The remainder or modulo of the division provides the offset value within the identified storage tile 404 for the processing tile 304. The persistent hash map contains a vector of bits for each processing tile 304 in the storage tile 404 that determines whether the processing tile 304 is computed and in the storage tile 404 on disk 212. The problem arises as to determining which bit in the vector identifies the particular processing tile 304 located at the offset value. In one or more embodiments of the invention, the processing tiles 304 are linearized within each storage tile 404.

The processing tiles 304 are mapped (and stored) linearly in each storage tile 404 beginning with the bottom left corner, progressing across the row for the specified number of columns, and then moving to the beginning of the row located immediately above. As each processing tile 304 is mapped, a processing tile (PT) index beginning with 0 at the lower left processing tile 304 may be stored or created for the hash map. The index value is increased as each processing tile 304 is mapped to the storage tile 404. Accordingly, the processing tiles 304 at the following locations have the indicated indices (as illustrated in FIG. 4):

| Processing Tile (PT) Location | Index |
|---|---|
| PT(−4, −2) (located at ST(0, 0)) | 0 |
| PT(−3, −2) | 1 |
| PT(−2, −2) | 2 |
| PT(−1, −2) | 3 |
| PT(−4, −1) | 4 |
| PT(−3, −1) | 5 |
| PT(−2, −1) | 6 |
| PT(−1, −1) | 7 |

With the indices for each processing tile 304 identified, the issue arises as to how to determine which processing tile 304 contains the requested coordinates. The modulo (i.e., remainder) of the division operation is used to obtain the index. To obtain the index, the following equation is used:

(vertical offset*# of PT cols. in ST)+(horizontal offset)

Continuing with the above example, the vertical offset and horizontal offsets are the modulos of the division operation. The modulo from above is (2,1) and the number of PTs in an ST is (4,2). Thus, (2*4)+1=5+1=6. Accordingly, the index number for the processing tile located at (2,1) is 6.

As described above, various processing tiles 304 may not be present or may not be stored on disk 212 (i.e., in a storage tile 404) because the processing tile 304 (or the entire storage tile 404) may be occluded, may not have been computed, or may have been deleted from disk 212 or memory 210. For example, if a particular processing tile 304 for an image was occluded by another image 300 being displayed, such a processing tile 304 may not be stored on disk 212 or located in cache/memory 210 (i.e., within a storage tile 404). Further, a process or application may not yet have computed a particular processing tile 304 or may have deleted the processing tile 304 from storage (storage [i.e., disk storage 212] may be managed as a cache where storage tiles 404 or processing tiles 304 are removed as part of the disk cache protocol.

As described above, the persistent hash map is used to identify which processing tiles 304 have been computed and stored in disk 212. In the hash map, key-value pairs are stored.

The keys in the hash map are the identifications of an entity (referred to as the composition—i.e., the entity or composition the user is working on) for a particular time at a particular proxy level. Proxy levels provide the resolution at which an image is being edited/processed. Since different users can work at different resolutions for the same clip/composition, the particular proxy level needs to be identified. In addition, the key provides the storage tile horizontal coordinates, the storage tile vertical coordinates, and various flags that may contain additional information (e.g., whether a result is rendered or not).

Figure 5:
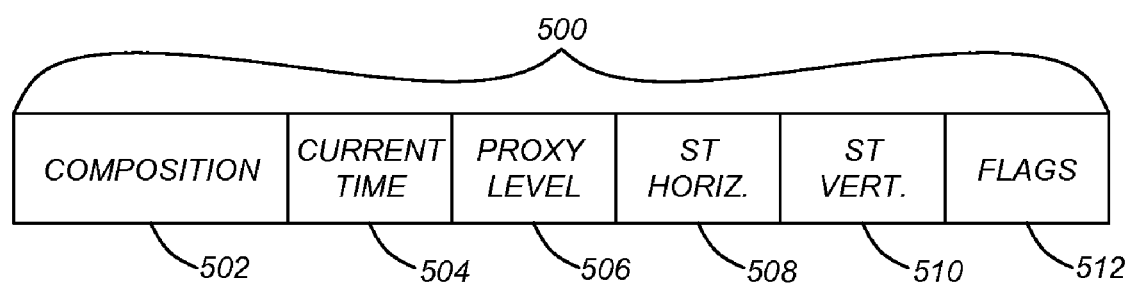
FIG. 5 illustrates the format of a key for a hash table in accordance with one or more embodiments of the invention.

To generate the key, the various values are merely appended together. FIG. 5 illustrates the format of the key 500 for the hash table. Bits 502 identify the composition, bits 504 identify the current time (i.e., the time within the clip being edited), bits 506 identify the proxy level, bits 508 identify the storage tile horizontal coordinates, bits 510 identify the storage tile vertical coordinates, and bits 512 identify the various flags. When the application is provided with the processing tile 304 coordinates, all of the information for the key is known or may be calculated. In this regard, the node that is requesting the processing tile knows the composition 502, the current time 504, the proxy level 506, and the various flags. Further, the storage tile 404 coordinates may be easily determined based on the processing tile 304 coordinates (as described above).

Figure 6:
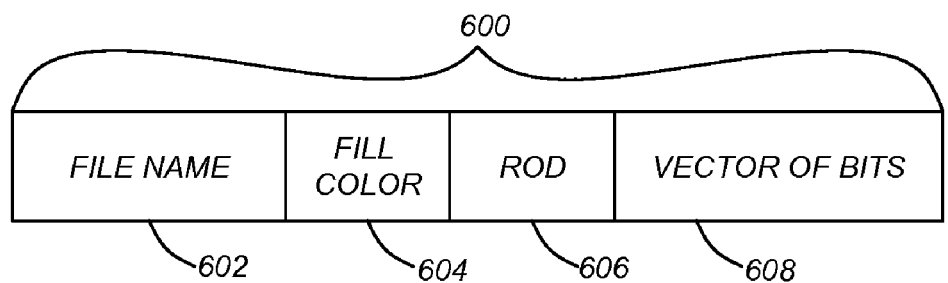
FIG. 6 illustrates the format of the value for each key of FIG. 5 in accordance with one or more embodiments of the invention.

The key 500 provides an index into the hash map that is used to determine the appropriate storage tile 404 location and whether the processing tile 304 has been computed and is stored in disk 212. FIG. 6 illustrates the format of the value 600 for each key 500. The value 600 for each key 500 is comprised of the name 602 of the file containing the storage tile 404 in storage 212, the fill color 604 (i.e., the color outside of the tile or ROD 300), information relating to the coordinates of the ROD 606, and a vector of bits 608.

The vector of bits 608 provides one bit for each processing tile 304 in the corresponding (i.e., keyed) storage tile 404. Each bit in the vector 608 indicates whether the processing tile 304 is present in the storage tile 404 (i.e., whether the processing tile 304 is valid or invalid). The vector of bits is indexed by the processing tile number (referred to as the index number) calculated as described above. For example, continuing with the example above if the processing tile 304 is (2,1), the index for the processing tile 304 in the storage tile is 6 (see FIG. 4). Accordingly, the $6^{th}$ bit of the vector of bits 608 is examined to determine if the processing tile 304 has been computed and is in the storage tile 404 on disk 212.

When storing a processing tile 304 (i.e., when it has been computed), the above described process and hash map is used to determine which file and location within the file and storage tile 404 to store the processing tile 304. After storing the processing tile 304, the vector of bits 608 in the hash map is updated to reflect the computation/storage of the processing tile 304.

When requesting a processing tile 304, the above procedure is used to determine the appropriate file to retrieve the storage file and also to determine if the processing tile 304 is in the storage tile 404. If not in the storage tile 404, the application will not retrieve any information.

In addition to the above, the processing tile 304 may not need to be retrieved. For example, occlusion may prevent a particular processing tile 304 from being required during processing. Accordingly, the ROD 606 within the hash map may be used to determine if the requested processing tile 304 is outside of the ROD 606. If the requested processing tile 304 is outside of the ROD, the fill color 604 may be returned to the user without even examining the vector of bits or retrieving the file name 602. In this regard, the processing tile 304 may not need to be computed at all and instead is merely comprised of a single color. The fill color may be a randomly selected color such as blue (e.g., having RGB value (0,0,254). Alternatively, if within the ROD 606, the other information within value 600 may be examined and/or the processing tile 304 may be computed.

Once the hash map is used to identify the file name, the file name (which likely contains an entire storage tile 404) is requested. Alternatively, the hash map may be used to identify all of the computed processing tiles 304 located within the storage tile 404 and all of the computed processing tiles are requested (e.g., merely by examining the vector of bits 608). All of the computed processing tiles 304 may be requested based on the presumption/likelihood that the application will request the other processing tiles 304 in the future. For example, all processing tiles may automatically be requested with the presumption that they will likely be processed/requested in the future. Alternatively, a heuristic may be used to determine which processing tiles 304 to request. For example, a historical profile across all clips, or this particular clip may be used to determine which processing tiles 304 in a storage tile 404 may be used next and such processing tiles may be requested. Such an analysis of prior requests may be based on a variety of trends/historical perspectives. Further, such an analysis may also determine which processing tiles 304 can be requested to minimize the number of seek operations The above-described methodology may be used by a compositing application to perform on-the-fly dynamic translation between the processing tile coordinate system and storage tile coordinate system. Further, certain information may be cached in memory 210 to further expedite processing. For example, the result of square root analysis that determines the number of processing tiles 304 that will fit in a storage tile 404 may be placed into cache memory 210. Thus, the calculation may be performed each time a new node begins processing or when the application is initialized. Further, if a user reconfigures or begins using processing tiles 304 for a different size image, all of the storage tiles 404 on disk 212 may be cleared when the application is initialized. In addition, since different nodes may operate at different resolutions, each node may perform a separate analysis of the ST/PT ratios and sizes and store the respective results in cache memory 210 (or on disk 212).

Logical Flow

Figure 7:
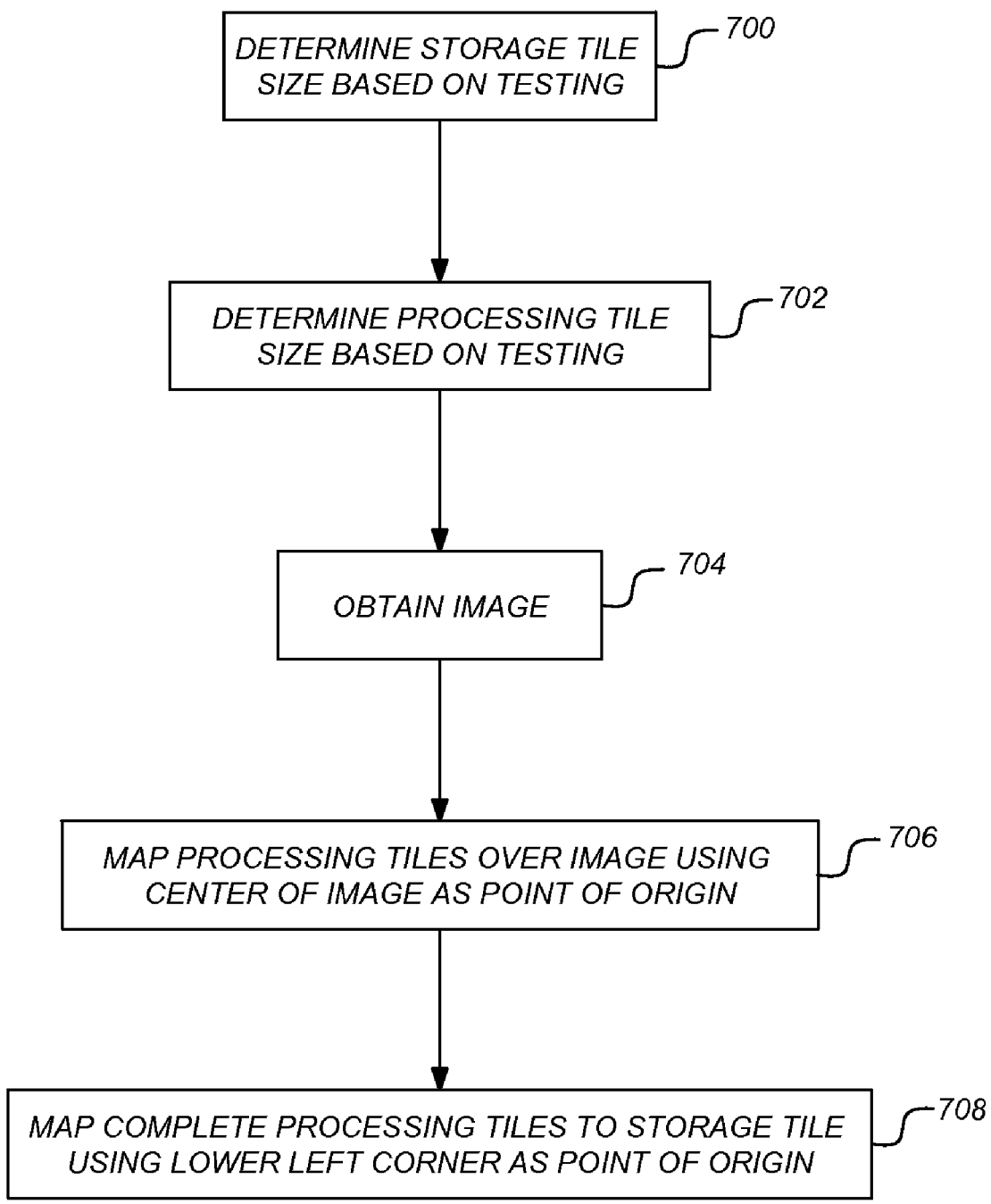
FIG. 7 illustrates the logical flow for implementing a method for mapping processing tiles and storage tiles on an image in accordance with one or more embodiments of the invention.

FIG. 7 illustrates the logical flow for implementing a method for mapping processing tiles 304 and storage tiles 404 on an image 300 in accordance with one or more embodiments of the invention. At step 700, a storage tile size is determined based on disk input/output (I/O) hardware benchmark testing. At step 702, a processing tile size is determined based on graphics I/O benchmark testing.

At step 704, an image to be used in a real-time compositing operation is examined. The step of obtaining the image 704 may comprise a request to access a particular processing tile 304. Such an access request may be a request for a particular processing tile 304 (e.g., to be used during a compositing application), or may comprise a request to store an already computed processing tile 304. Alternatively, the request may merely be for an image 300 (or a particular part of an image 300) to be used in a compositing operation in which case a determination must be made regarding which processing tile 304 and storage tile 404 is needed to conduct the compositing operation.

At step 706, multiple processing tiles 304 (of the processing tile size) are mapped over the image 300. Further, the center of the image 300 is used as a processing tile point of origin for a universal coordinate system for the multiple processing tiles 304.

At step 708, the multiple processing tiles 304 are mapped to one or more storage tiles 404. As described above, the storage tile point of origin for a storage tile coordinate system is located at a lower left corner of the multiple processing tiles 304 mapped over the image. Further, each storage tile 404 only contains complete processing tiles (and not partial tiles).

Steps 706 and 708 may also have additional limitations. For example, the number of processing tiles 304 and storage tiles 404 to use may be calculated before mapping the processing tiles 304 over the image 300. In this regard, a first number of processing tiles 304 that will cover the image 300 may be computed. Such a computation may be based on the size of the pixels, the size of the image 300, and the fixed size of the processing tiles 304 computed/determined at step 702. A second number comprised of the number of processing tiles 304 that will fit in one of the storage tiles 404 is computed. Such a computation may merely be a ratio of the storage tile size to the processing tile size computed at steps 700 and step 702. With the ratio, a third number may be computed which comprises the total number of processing tiles 304 that will cover the image. The third number is computed based on the first and second numbers that comprises the actual number of processing tiles 304 that will be used/mapped over the image 300.

The second number may be computed not only by the ratio. In addition, as described above, a square root of the ratio may be computed/determined to obtain a square tile (i.e., an Y×Y tile). The square root may be rounded down resulting in a number of columns of processing tiles 304 and number of rows of processing tiles 304 that will fit in a single storage tile. The number of columns may be increased by one and the result may be multiplied by the number of rows to obtain a potential new number of processing tiles 304. If the potential new number of processing tiles is larger than the ratio, the number of columns is decreased by one and the square is expanded in the other direction (i.e., by rows). If the potential number of processing tiles 304 is not larger than the ratio, the process repeats by continuing to expand in the column direction (i.e., until the expanded square is larger than the ratio at which point 1 is subtracted and the process continues).

Once the expansion by columns is complete, the square/rectangle (representing the layout/format of the processing tiles 304) is expanded in the other direction (i.e., by rows). Accordingly, the number of rows is increased by one and multiplied by the number of columns to determine if it exceeds the ratio. If the expanded rectangle is larger than the ratio, the last expansion is backed-off and the process is complete. Alternatively, the number of rows can continue to be expanded and the comparison conducted.

The resulting expanded rectangle is then used as the layout/format and number of processing tiles 304 that will fit in the storage tiles 404. Based on this layout and number of processing tiles, when mapped over the image 300, the processing tiles 304 may extend beyond the boundary of the image or ROD 300. In this regard, the lower left corner of the multiple processing tiles mapped over the image may extend beyond the ROD of the image.

The mapping process set forth in step 708 may comprise a linear mapping process that begins with a processing tile 304 located at the storage tile point of origin. In this regard, for the first row in the storage tile 404 (referred to as the storage row), the number of columns (i.e., determined through the expanded rectangle method described above) of processing tiles 304 are mapped to a storage tile 404. The first storage row is increased by one to identify the storage row located immediately above the first storage row and the mapping continues until the number of processing tiles 304 is complete. In this regard, the layout and format of the processing tiles 304 in a storage tile 404 determined as described above are properly mapped.

It may also be noted that the linearization process may also assign a numerical value/index to each tile beginning with 0. In this regard, the index begins anew in each storage tile 404 with the processing tile 304 located in the lower left corner of each storage tile 404. Each processing tile that is stored in a storage tile progressing to the right across the storage tile 404 is assigned a subsequent number until the total number of processing tiles 304 per storage tile 404 is complete. As illustrated in FIG. 4, the processing tiles 304 may have indices between 0 and 7 for each storage tile 404.

Figure 8:
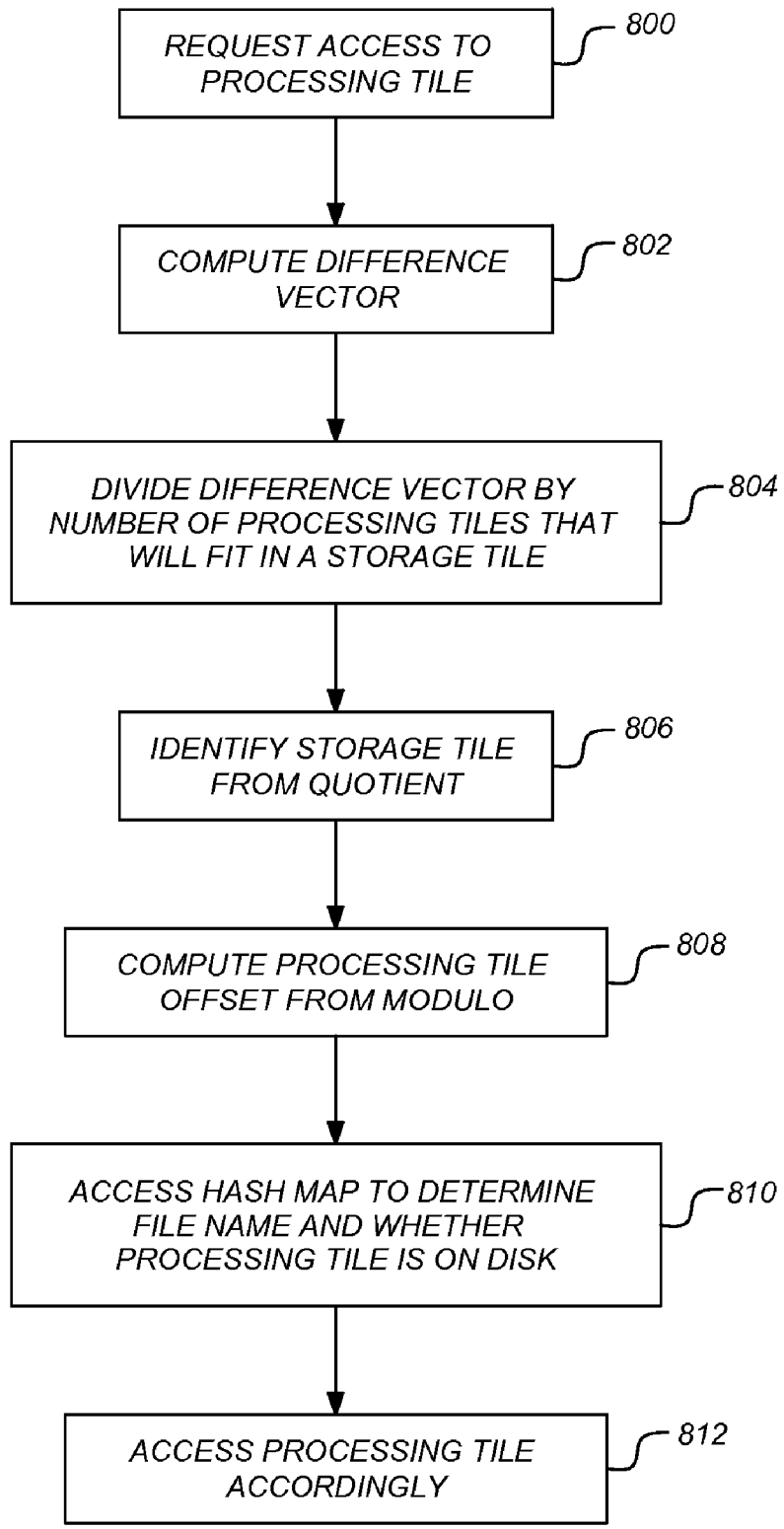
FIG. 8 is a flow chart illustrating the process of accessing a processing tile in accordance with one or more embodiments of the invention.

FIG. 8 is a flow chart illustrating the process of accessing a processing tile 304 (e.g., via storing the processing tile 304 on disk 212 or requesting the processing tile 304 from disk 212—i.e., conducting a disk I/O operation). At step 800, access to a processing tile 304 is requested (i.e., a request to store the processing tile 304 or to retrieve a processing tile 304).

Once requested, the system continues by determining a requested storage tile 404 by determining which storage tile 404 is mapped to the requested processing tile 304. In this regard, if a processing tile 304 is being retrieved, the request may be modified into a request for all of the processing tiles 304 located in the requested storage tile 404. On the other hand, if the processing tile 304 is merely being stored, the associated storage tile must be determined.

Steps 802-812 describe the process of accessing the appropriate processing tile 304 and storage tile 404 on disk 212. At step 802, a difference vector from coordinates of the requested processing tile 304 to processing tile 304 coordinates corresponding to the storage tile point of origin is computed (thereby providing an offset by processing tiles 304 from the storage tile point of origin). A processing tile coordinate number comprised of a column size number and a row size number of how many columns and rows respectively of the multiple processing tiles 304 will fit into the one or more storage tiles 404 is determined (e.g., as described above).

At step 804, the difference vector is divided by the processing tile coordinate number in each respective direction to obtain quotient coordinates and remainder offset coordinates. At step 806, the storage tile 404 is identified by the quotient coordinates. In this regard, the quotient provides the coordinates of the storage tile 404 that contains the provided processing tile 304 coordinates.

At step 808, the processing tile 304 offset is computed from the modulo or remainder offset coordinates. This remainder provides the offset value within the storage tile 404 identified at step 806 for the processing tile 304. Namely, the remainder offset coordinates provide a vertical offset coordinate and a horizontal offset coordinate. While such coordinate values may be useful, the location within the file containing the storage tile 404 on disk 212 is not known. In this regard, the offset values may be linearized as part of step 808. The linear number is computed by multiplying the vertical offset coordinate by the column size number (i.e., the number of columns of processing tiles 304 that fit in a storage tile 404) and adding the horizontal offset coordinate. Such a value provides a linear index for the processing tiles 304 within a storage tile 404.

At step 810, a hash map is accessed to determine the file name (i.e., containing the storage tile identified at step 806) and whether the processing tile 304 (i.e., identified at step 808) is on disk 212. In this regard, the hash map contains keys and values where the keys comprise a composition, time, proxy level, and storage tile identifier (i.e., obtained at step 806). The value for each key is a file name (in which the identified storage tile 404 is stored) and a vector of bits. The vector of bits comprises a bit for each processing tile 304 that identifies whether each processing tile 304 is stored on disk 212. The bits in the vector of bits are ordered based on the linear number. Accordingly, using the information known, the appropriate key is accessed to determine the filename and then the appropriate bit (based on the linear number) is accessed to determine if the computed processing tile 304 is on disk 212 or not.

At step 812, the processing tile 304 (i.e., identified at step 808) is accessed accordingly. In this regard, if the hash map/entry in the vector of bits provides that the processing tile 304 has not been computed (e.g., a 0 value is present at the appropriate index location), the processing tile 304 may then be computed at later stored on disk 212. When stored, the hash map (including the file name if necessary) is updated accordingly If the hash map/entry in the vector of bits provides that the processing tile 304 is on disk 212 (e.g., a 1 value is present at the appropriate index location), a disk I/O operation may be performed to retrieve the file containing the storage tile 404 that contains the processing tile 304. Such an I/O operation may further involve issuing a request for all of the processing tiles 304 that are stored in the storage tile 404 (or alternatively, a request for those processing tiles 304 in the storage tile 404 that have been computed—i.e., as set forth in the hash map).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for storing image data for use in a real-time compositing computer application comprising:
   (a) determining a storage tile size based on disk input/output (I/O) hardware testing;
   (b) determining a processing tile size based on graphics I/O testing;
   (c) obtaining an image to be used in a real-time compositing operation;
   (d) mapping multiple processing tiles over the image, wherein:
      (i) each of the multiple processing tiles is of the processing tile size; and
      (ii) a center of the image is used as a processing tile point of origin for a universal coordinate system for the multiple processing tiles;
   (e) mapping the multiple processing tiles to one or more storage tiles wherein:

(i) a storage tile point of origin for a storage tile coordinate system is located at a lower left corner of the multiple processing tiles mapped over the image; and
(ii) each storage tile is configured to contain one or more complete processing tiles; and
(f) storing one or more of the multiple processing tiles in the one or more storage tiles based on the storage tile size, processing tile size, and the mappings.

2. The method of claim 1 further comprising:
computing a first number of processing tiles that will cover the image;
computing a second number of processing tiles that will fit in one of the storage tiles having the storage tile size;
computing a third number of processing tiles based on the first number and the second number; and
wherein the mapping the multiple processing tiles over the image comprises mapping the third number of processing tiles over the image.

3. The method of claim 2 wherein the computing the second number comprises:
(1) computing a ratio by dividing the storage tile size by the processing tile size;
(2) determining a square tile number by computing a square root of the ratio;
(3) round down the square tile number to obtain a rounded square tile number, wherein a number of columns of processing tiles that will fit in the storage tile and number of rows of processing tiles that will fit in the storage tile are set equal to the rounded square tile number;
(4) increasing the number of columns of processing tiles by one;
(5) multiplying the number of columns by the number of rows to obtain a potential number of processing tiles;
(6) if the potential number of processing tiles is larger than the ratio, decrease the number of columns by one and continue to step (8);
(7) if the potential number of processing tiles is not larger than the ratio, go back to step (4);
(8) increasing the number of rows of processing tiles by one;
(9) multiplying the number of columns by the number of rows to determine the potential number of processing tiles;
(10) if the potential number of processing tiles is larger than the ratio, decrease the number of rows by one and continue to step (12);
(11) if the potential number of processing tiles is not larger than the ratio, go back to step (8); and
(12) set the number of processing tiles equal to the potential number of processing tiles.

4. The method of claim 3 wherein the mapping the number of processing tiles in each storage tile comprises linearly mapping the processing tiles to the one or more storage tiles beginning in a first storage row having the processing tile located at the storage tile point of origin by:
for the first storage row, mapping the number of columns of processing tiles to the storage tile;
increasing the first storage row by one to identify a storage row located above the first storage row;
repeat the mapping and increasing steps until the number of processing tiles has been mapped;
when the number of processing tiles has been mapped, proceeding to a subsequent storage tile and repeating the above steps until the image is mapped.

5. The method of claim 1 wherein the lower left corner of the multiple processing tiles mapped over the image extends beyond a region of definition (ROD) of the image.

6. The method of claim 1 further comprising:
receiving a request for a requested processing tile comprised of one of the multiple processing tiles; and
determining a requested storage tile by determining which storage tile is mapped to the requested processing tile.

7. The method of claim 6 wherein the determining the requested storage tile comprises:
computing a difference vector from coordinates of the requested processing tile to processing tile coordinates corresponding to the storage tile point of origin;
determining a processing tile coordinate number comprised of a column size number and a row size number of how many columns and rows respectively of the multiple processing tiles fit into one of the one or more storage tiles;
dividing the difference vector by the processing tile coordinate number in each respective direction to obtain quotient coordinates and remainder offset coordinates; and
the requested storage tile comprises the storage tile located at the quotient coordinates.

8. The method of claim 7 further comprising:
wherein the remainder offset coordinates comprises a vertical offset coordinate and a horizontal offset coordinate;
computing a linear number comprising the vertical offset coordinate*the column size number+the horizontal offset coordinate; and
accessing a hash map to determine if the requested processing tile identified by the linear number in the requested storage tile is stored on disk.

9. The method of claim 8, wherein the hash map comprises:
one or more keys comprising a composition, a time, a proxy level, and a storage tile identifier; and
a value for each of the one or more keys comprising a file name in which an identified storage tile identified by the storage tile identifier is stored, and a vector of bits comprising a bit for each processing tile in the identified storage tile that identifies whether each processing tile is stored on disk, wherein the bits in the vector of bits are ordered based on the linear number.

10. A computer implemented system for storing image data for use in a real-time compositing computer application comprising:
(a) a computer;
(b) a real-time compositing application executing in the computer;
(c) an image to be used in the real-time compositing application;
(d) multiple processing tiles accessed by the real-time compositing application, wherein:
(i) each processing tile has a processing tile size based on graphics I/O testing;
(ii) the multiple processing tiles are mapped over the image; and
(iii) a center of the image is used as a processing tile point of origin for a universal coordinate system for the multiple processing tiles;
(e) a storage tile accessed by the real-time compositing application, wherein the storage tile has a storage tile size based on disk input/output (I/O) hardware testing, wherein:
(i) the multiple processing tiles are mapped to one or more storage tiles wherein:
(ii) a storage tile point of origin for a storage tile coordinate system is located at a lower left corner of the multiple processing tiles mapped over the image; and (iii) each storage tile is configured to contain one or more complete processing tiles; and (iv) one or more of the multiple processing tiles are stored in the one or more storage tiles based on the storage tile size, processing tile size, and the mappings.

11. The system of claim 10 wherein the real-time compositing application is configured to:

compute a first number of processing tiles that will cover the image;

compute a second number of processing tiles that will fit in one of the storage tiles having the storage tile size;

compute a third number of processing tiles based on the first number and the second number; and wherein the mapping the multiple processing tiles over the image comprises mapping the third number of processing tiles over the image.

12. The system of claim 11 wherein the real-time compositing application is configured to compute the second number by:

(1) computing a ratio by dividing the storage tile size by the processing tile size;

(2) determining a square tile number by computing a square root of the ratio;

(3) round down the square tile number to obtain a rounded square tile number, wherein a number of columns of processing tiles that will fit in the storage tile and number of rows of processing tiles that will fit in the storage tile are set equal to the rounded square tile number;

(4) increasing the number of columns of processing tiles by one;

(5) multiplying the number of columns by the number of rows to obtain a potential number of processing tiles;

(6) if the potential number of processing tiles is larger than the ratio, decrease the number of columns by one and continue to step (8);

(7) if the potential number of processing tiles is not larger than the ratio, go back to step (4);

(8) increasing the number of rows of processing tiles by one;

(9) multiplying the number of columns by the number of rows to determine the potential number of processing tiles;

(10) if the potential number of processing tiles is larger than the ratio, decrease the number of rows by one and continue to step (12);

(11) if the potential number of processing tiles is not larger than the ratio, go back to step (8); and

(12) set the number of processing tiles equal to the potential number of processing tiles.

13. The system of claim 12 wherein the mapping the number of processing tiles in each storage tile comprises linearly mapping the processing tiles to the one or more storage tiles beginning in a first storage row having the processing tile located at the storage tile point of origin by:

for the first storage row, mapping the number of columns of processing tiles to the storage tile;

increasing the first storage row by one to identify a storage row located above the first storage row;

repeat the mapping and increasing steps until the number of processing tiles has been mapped; and when the number of processing tiles has been mapped, proceeding to a subsequent storage tile and repeating the above steps until the image is mapped.

14. The system of claim 10 wherein the lower left corner of the multiple processing tiles mapped over the image extends beyond a region of definition (ROD) of the image.

15. The system of claim 10 wherein the real-time compositing application is configured to:

receive a request for a requested processing tile comprised of one of the multiple processing tiles; and determine a requested storage tile by determining which storage tile is mapped to the requested processing tile.

16. The system of claim 15 wherein the real-time compositing application is configured to determine the requested storage tile by:

computing a difference vector from coordinates of the requested processing tile to processing tile coordinates corresponding to the storage tile point of origin;

determining a processing tile coordinate number comprised of a column size number and a row size number of how many columns and rows respectively of the multiple processing tiles fit into one of the one or more storage tiles;

dividing the difference vector by the processing tile coordinate number in each respective direction to obtain quotient coordinates and remainder offset coordinates; and the requested storage tile comprises the storage tile located at the quotient coordinates.

17. The system of claim 16 wherein the wherein the remainder offset coordinates comprises a vertical offset coordinate and a horizontal offset coordinate; and wherein the real-time compositing application is configured to:

compute a linear number comprising the vertical offset coordinate*the column size number +the horizontal offset coordinate; and access a hash map to determine if the requested processing tile identified by the linear number in the requested storage tile is stored on disk.

18. The system of claim 17, wherein the hash map comprises:

one or more keys comprising a composition, a time, a proxy level, and a storage tile identifier; and a value for each of the one or more keys comprising a file name in which an identified storage tile identified by the storage tile identifier is stored, and a vector of bits comprising a bit for each processing tile in the identified storage tile that identifies whether each processing tile is stored on disk, wherein the bits in the vector of bits are ordered based on the linear number.

19. A program storage device, readable by a computer, tangibly embodying at least one program of instructions executable by the computer to perform method steps of storing image data for use in a real-time compositing computer application the method steps comprising the steps of:

(a) determining a storage tile size based on disk input/output (I/O) hardware testing;

(b) determining a processing tile size based on graphics I/O testing;

(c) obtaining an image to be used in a real-time compositing operation;

(d) mapping multiple processing tiles over the image, wherein:

(i) each of the multiple processing tiles is of the processing tile size; and (ii) a center of the image is used as a processing tile point of origin for a universal coordinate system for the multiple processing tiles;

(e) mapping the multiple processing tiles to one or more storage tiles wherein:

(i) a storage tile point of origin for a storage tile coordinate system is located at a lower left corner of the multiple processing tiles mapped over the image; and (ii) each storage tile is configured to contain one or more complete processing tiles; and (f) storing one or more of the multiple processing tiles in the one or more storage tiles based on the storage tile size, processing tile size, and the mappings.

20. The program storage device of claim 19 wherein the method steps further comprise:
computing a first number of processing tiles that will cover the image;
computing a second number of processing tiles that will fit in one of the storage tiles having the storage tile size;
computing a third number of processing tiles based on the first number and the second number; and
wherein the mapping the multiple processing tiles over the image comprises mapping the third number of processing tiles over the image.

21. The program storage device of claim 20 wherein the computing the second number comprises:
(1) computing a ratio by dividing the storage tile size by the processing tile size;
(2) determining a square tile number by computing a square root of the ratio;
(3) round down the square tile number to obtain a rounded square tile number, wherein a number of columns of processing tiles that will fit in the storage tile and number of rows of processing tiles that will fit in the storage tile are set equal to the rounded square tile number;
(4) increasing the number of columns of processing tiles by one;
(5) multiplying the number of columns by the number of rows to obtain a potential number of processing tiles;
(6) if the potential number of processing tiles is larger than the ratio, decrease the number of columns by one and continue to step (8);
(7) if the potential number of processing tiles is not larger than the ratio, go back to step (4);
(8) increasing the number of rows of processing tiles by one;
(9) multiplying the number of columns by the number of rows to determine the potential number of processing tiles;
(10) if the potential number of processing tiles is larger than the ratio, decrease the number of rows by one and continue to step (12);
(11) if the potential number of processing tiles is not larger than the ratio, go back to step (8); and
(12) set the number of processing tiles equal to the potential number of processing tiles.

22. The program storage device of claim 21 wherein the mapping the number of processing tiles in each storage tile comprises linearly mapping the processing tiles to the one or more storage tiles beginning in a first storage row having the processing tile located at the storage tile point of origin by:
for the first storage row, mapping the number of columns of processing tiles to the storage tile;
increasing the first storage row by one to identify a storage row located above the first storage row;
repeat the mapping and increasing steps until the number of processing tiles has been mapped;
when the number of processing tiles has been mapped, proceeding to a subsequent storage tile and repeating the above steps until the image is mapped.

23. The program storage device of claim 19 wherein the lower left corner of the multiple processing tiles mapped over the image extends beyond a region of definition (ROD) of the image.

24. The program storage device of claim 19 further comprising:
receiving a request for a requested processing tile comprised of one of the multiple processing tiles; and
determining a requested storage tile by determining which storage tile is mapped to the requested processing tile.

25. The program storage device of claim 24 wherein the determining the requested storage tile comprises:
computing a difference vector from coordinates of the requested processing tile to processing tile coordinates corresponding to the storage tile point of origin;
determining a processing tile coordinate number comprised of a column size number and a row size number of how many columns and rows respectively of the multiple processing tiles fit into one of the one or more storage tiles;
dividing the difference vector by the processing tile coordinate number in each respective direction to obtain quotient coordinates and remainder offset coordinates; and
the requested storage tile comprises the storage tile located at the quotient coordinates.

26. The program storage device of claim 25 further comprising:
wherein the remainder offset coordinates comprises a vertical offset coordinate and a horizontal offset coordinate;
computing a linear number comprising the vertical offset coordinate*the column size number+the horizontal offset coordinate; and
accessing a hash map to determine if the requested processing tile identified by the linear number in the requested storage tile is stored on disk.

27. The program storage device of claim 26, wherein the hash map comprises:
one or more keys comprising a composition, a time, a proxy level, and a storage tile identifier; and
a value for each of the one or more keys comprising a file name in which an identified storage tile identified by the storage tile identifier is stored, and a vector of bits comprising a bit for each processing tile in the identified storage tile that identifies whether each processing tile is stored on disk, wherein the bits in the vector of bits are ordered based on the linear number.

* * * * *